Feb. 2, 1960 — G. M. HIEBER — 2,923,904
DIFFERENTIAL TRANSFORMER ACCELEROMETER
Filed Nov. 18, 1957 — 2 Sheets-Sheet 1

INVENTOR.
GEORGE M. HIEBER
BY
Cyrus D. Samuelson
ATTORNEY

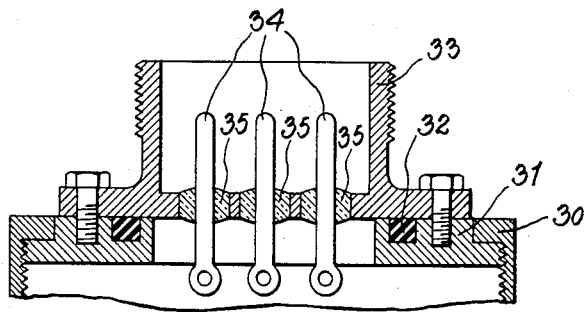
Fig. 3.
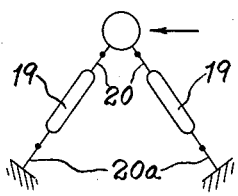
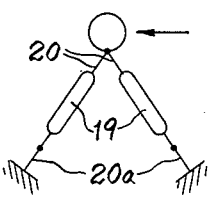
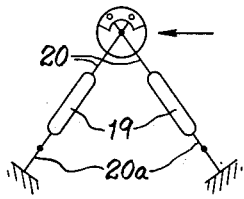
Fig. 4.  Fig. 6.  Fig. 8.
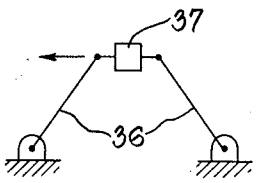
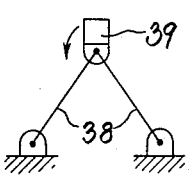
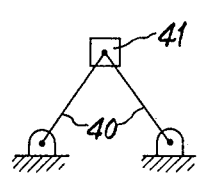
Fig. 5.  Fig. 7.  Fig. 9.

United States Patent Office 2,923,904
Patented Feb. 2, 1960

2,923,904

DIFFERENTIAL TRANSFORMER ACCELEROMETER

George M. Hieber, Berkeley Heights, N.J., assignor to Gulton Industries, Inc., Metuchen, N.J., a corporation of New Jersey Application November 18, 1957, Serial No. 697,073

7 Claims. (Cl. 336—30)

My invention relates to differential transformer accelerometers and in particular to means for supporting the spring-mass system of such accelerometers so that it will respond to accelerations along one axis only and to means for calibrating such accelerometers both statically and dynamically without the use of external calibrating fixtures.

In an accelerometer it is necessary that the spring-mass system be supported so that it will respond to accelerations along one axis and will not move in any other lateral direction. Bearings may be used to accomplish this but their inherent friction is so great as to make their use impractical.

To overcome the above disadvantage, resort has been made to the use of spring suspensions produced in accordance with the teaching of Patent 2,562,183 of Emil H. Greibach. These suspensions serve as the seismic spring in addition to allowing movement along the sensitive axis and retarding movement in any lateral direction. However, if the total seismic deflection is more than $\frac{1}{50}$ of the spring diameter, the system is excessively non-linear.

A need exists for a system which is relatively free of frictional effects due to the support structure, is substantially linear and is characterized by minimum response to lateral forces in directions other than along the sensitive axis. Furthermore, it is desirable to have a differential transducer accelerometer which may be calibrated without the need of external calibrating fixtures.

Accordingly, it is a principal object of my invention to provide a differential transformer accelerometer which is substantially linear and may be calibrated statically and dynamically.

It is a further object of my invention to provide such an accelerometer wherein the spring-mass system is supported so that it will be responsive along the sensitive axis and will be restrained from movement in any lateral direction.

It is a still further object of my invention to provide such an accelerometer wherein the spring-mass system is supported by struts comprised of wires at the points of flexure.

Other objects and advantages of my invention will be apparent during the course of the following discussion when taken in conjunction with the accompanying drawings wherein:

Figure 3 is a cross-sectional view of the connecting plug elements used in my invention, and Figures 4 through 9 are diagrammatic plan views of strut support arrangements used to explain the theory underlying my invention.

Figures 1, 2:
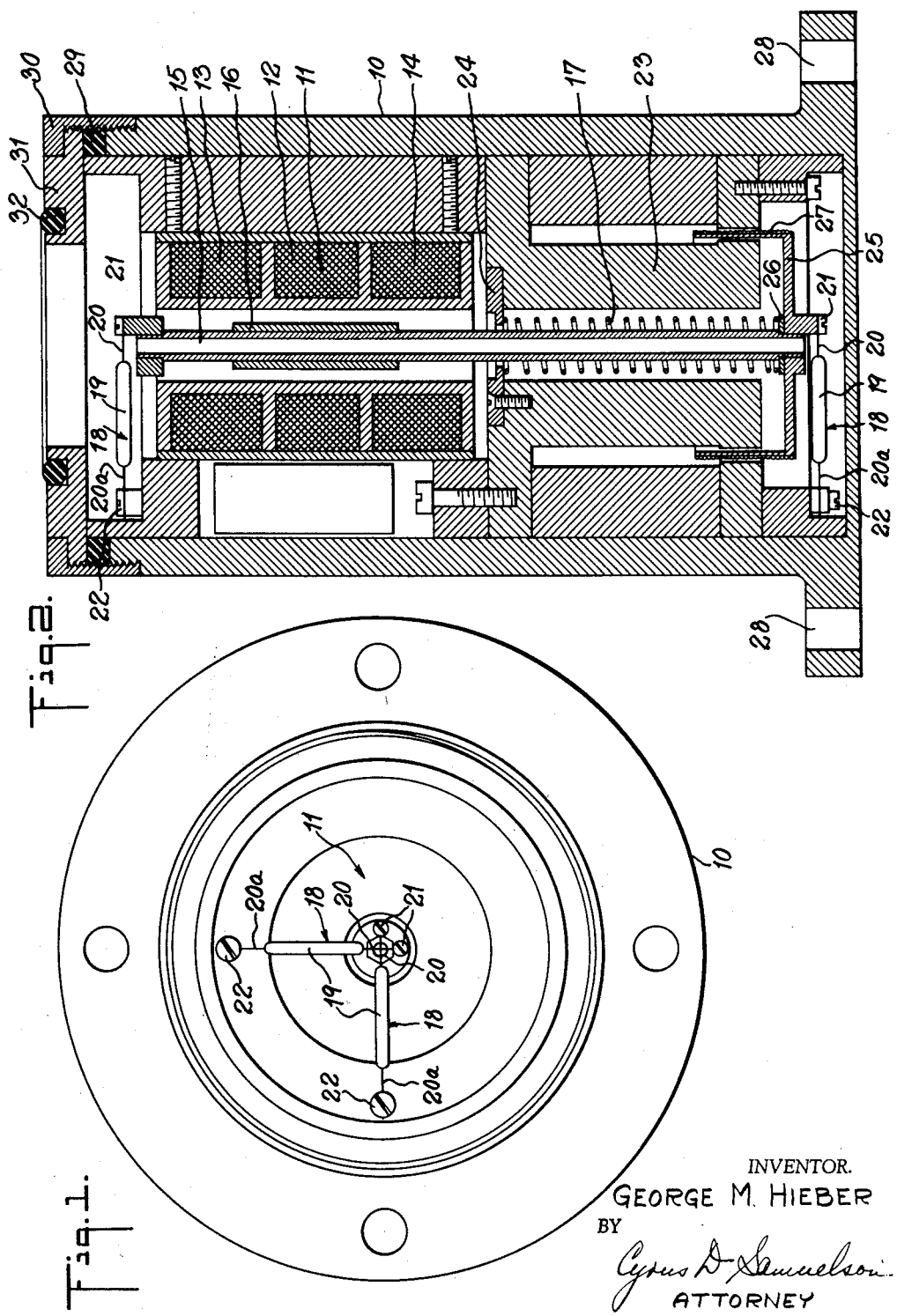
Figure 1 is a plan view of a preferred embodiment of my invention with the connecting plug elements removed.
Figure 2 is a cross-sectional view along the line 2—2 of Figure 1.

In the drawings, wherein, for the purpose of illustration is shown a preferred embodiment of my invention, the housing is designated as 10. Suitably mounted in the upper portion of the housing is a differential transformer which is generally designated as 11. 11 comprises primary coil 12 and secondary coils 13 and 14. Mounted within the central opening of 11 and free to move parallel to the axis of 11, is tubular core 15 which is formed of nonmagnetic material. 15 extends into the lower half of 10. Magnetic core 16 is mounted on 15 and is placed so that when 15 is at rest there are equal areas of 16 surrounded by 13 and 14. Helical spring 17 is the seismic spring and is wound about the lower portion of 15.

In the disclosed illustrative embodiment, the housing 10 is assumed to have a diameter of 2 inches and a length of 3½ inches. In the differential transformer 11, the primary coil 12 comprises 2700 turns of #36 copper wire; and the secondary coils 13 and 14 each comprise 3900 turns of #43 wire. The three coils are wound on a coil form having an inner diameter of .312 inch and walls $\frac{1}{16}$ inch thick, with the primary coil 12 sandwiched between secondary coils 13 and 14, all three having an equal axial extent of 0.4 inch.

The tubular core 15, which is formed, for example, of an aluminum alloy, has a length of 3 inches, an inside diameter of $\frac{1}{16}$ inch, and an outside diameter of $\frac{1}{8}$ inch. The magnetic core 16 comprises a sleeve .050 inch thick of ingot iron, mounted on the outer periphery of the tubular core 15, and extending axially about ¾ inch, so that in a rest position, its ends extend beyond the end of primary coil 12, and respectively extend for equal lengths, of about 0.175 inch along the axis of coils 13 and 14.

The mass of the seismic system which includes the shaft 15, the magnetic core 16, and the cup 25, is 12 grams and the natural frequency approximately 25 cycles.

15 is supported by structs 18 mounted at both ends. 18 comprises rigid member 19 formed of stainless steel capillary tubing $\frac{1}{16}$ inch outside diameter, .006 inch inside diameter and .750 inch long into which a flexible wire, preferably of stainless steel .003 inch in diameter, is inserted and pinched in place so that flexible wires 20 and 20a protrude as shown in the figures. Struts 18 are attached to housing 10 by screws 22 and to tubular core 15 by screws 21. Struts 18 are so arranged that wires 20 cross each other in line with the center of gravity of the spring-mass system. It is best for struts 18 to be perpendicular to each other for maximum efficiency but angles in the range 60° to 120° are satisfactory to carry out the teachings of my invention. The spring-mass system is comprised of 15, 16, 17 and damping cup 25. 25 is formed of conductive material such as aluminum or copper and by cutting the magnetic field of magnet 23, a current is generated in the cup and this energy is dissipated as heat. The dissipation of energy as heat serves to damp the movement of 15 when under the influence of an accelerating force.

The spring 17 is connected to washers 24 and 26 which, in turn, serve to anchor the spring to the case and to the seismic mass, respectively. Coil 27 is employed for calibrating the system and is wound around damping cup 25. The unit is filled with argon or similar gas and sealed by means of O-ring 29 and cap 31. The leads from 11 and 27 are brought out through cap 31 on pins 34 as shown in Figure 3. 31 is held in place by threaded lock 30. O-ring 32 is held between 31 and hermetically sealed connector 33 which is affixed to 31 as shown in Figure 3. Pins 34 are insulated from each other by glass beads 35, all of which elements are part of connector 33. Sufficient pins 34 are provided in each specific connector 33 to accommodate all electrical connections which must be made to the unit. The unit is mounted to the device being tested by means of mounting holes 28.

In operation, the accelerometer is rigidly mounted on the device being tested by means of screws or bolts inserted through mounting holes 28. An alternating voltage is applied to primary coil 12 through electrical leads (not shown) from a source of supply (not shown). When the unit is not subjected to acceleration, the output currents from secondary coils 13 and 14 are equal and are compared on detection means (not shown) such as a differential ammeter. When the unit is subjected to acceleration, 15 moves so that more of 16 is within one of the coils 13 and 14 than the other, thereby changing their coupling to the primary winding and making their output voltages unequal. This causes a change in the secondary currents being compared in the detection circuit and enables one to read both the amount of acceleration and its directional sense.

Damping cup 25 is formed so that it moves in the magnetic field of magnet 23 and serves to increase the useful measurement range of the unit by retarding and slowing down the movement of 15 when it is subjected to acceleration. Spring 17 is helical in form and is placed so that 15 is within 17. 17 is held between 24, which is affixed to 23 and thus to 10, and 26 which is affixed to 25 and 15. As a result, 17 expands as 15 moves down and contracts as 15 moves up. The system is so arranged that when there is no accelerating force present, the system is balanced and there is no net output voltage from the instrument.

In order to keep shaft 15 aligned and substantially insensitive to lateral acceleration, it is held at either end by a pair of substantially perpendicular struts 18. 18 comprises a substantially rigid material 19 in the center formed of capillary tubing of dimensions substantially as previously described and wherein ends 20 and 20a of a stainless steel wire approximately .003" in diameter protrude therefrom. 19, 20 and 20a may be formed of other material so long as 18 has the proper mechanical characteristics. 18 is clamped to 15 by means of screws 21 and to 10 by means of screws 22. Screws 21 are placed so that wires 20 cross in line with the center of gravity of 15 and its associated moving system.

Figures 4 through 9 serve to illustrate the theory underlying my invention. If the suspension were built in accordance with Figure 4, there would be four points of flexure at the points marked by the black dots of Figure 4. A lateral force in the direction, for example, of the arrow of Figure 4 will cause the system to move in the direction of the arrow of Figure 5 wherein lines 36 are the schematic equivalents of the struts of Figure 4 and 37 is the schematic equivalent of the accelerometer mass. It can be seen that Figure 5, which is the schematic equivalent of Figure 4 is, in effect, an unstable trapezoidal mechanism.

If the system were built in accordance with Figure 6, of which Figure 7 is a schematic representation, there would be three points of flexure as shown by the black dots of Figure 6. A lateral force in the direction indicated by the arrow of Figure 6 will cause mass 39, which is the schematic equivalent of the accelerometer mass, to rotate in the direction indicated by the arrow of Figure 7. Lines 38 are the schematic equivalents of the strut combinations 19—20—20a of Figure 6.

If the system were built in accordance with Figure 8, of which Figure 9 is a schematic representation, there would be three points of flexure as shown by the three black dots of Figure 8. 41 is a schematic representation of the accelerometer mass and lines 40 are schematic representations of the strut combinations 19—20—20a of Figure 8. As can be seen from an examination of Figures 8 and 9, a lateral force in the direction of the arrow of Figure 8 will not produce any appreciable lateral motion or rotation of mass 41 because the combination is an inherently stable structure. By making the points of flexure of struts 18 wires 20 and 20a, bending is achieved without effectively increasing the stiffness of the system, as the spring constant of 17 is at least 10 times that of struts 18. This also tends to minimize any nonlinearity introduced by struts 18.

It is very simple to calibrate accelerometers of my invention without the use of external calibrating fixtures, shock tables, ballistic pendulums or similar devices. 10 is affixed to a table or other rigid support by means of mounting holes 28 and a known current is applied to coil 27 through the associated leads (not shown). This current changes the magnetic field and causes 15 to move, thereby causing a change in the secondary currents being compared in the detection circuit and making it possible to correlate the current values against core movement and acceleration. If a direct current is applied to 27, the complete system including both the transducer and spring-mass system is calibrated statically and if an alternating current is applied to 27, the complete system is calibrated dynamically.

While I have described my invention by means of specific examples and in a specific embodiment, I do not wish to be limited thereto, for obvious modifications will occur to those skilled in the art without departing from the spirit of my invention or the scope of the subjoined claims.

Having thus described my invention, I claim:

1. An accelerometer comprising a tubular housing containing a lower and upper portion, the upper portion containing a pair of coaxially spaced secondary coils and a primary coil disposed in said space coaxially of said secondary coils in fixed end to end relation to each other, a source of alternating current adapted to be supplied to said primary coil, a tubular core of nonmagnetizable material extending through both the lower and upper portions of said housing, said tubular core having magnetizable material mounted thereon and disposed within said coils, the core being axially movable with respect to said coils during operation of the device, all of the coils being electrically symmetrical about the center of the primary coil and the length of said magnetizable material itself being greater than the length of said primary coil and so proportioned to the overall length of the combined coils that when the core is moved in one direction from said center, the core acts to increase the flux linkage between the primary and one of the secondaries and to decrease the flux linkage with the other secondary thereby to produce a net differential voltage across the two secondaries with a magnitude which is a linear function of the axial displacement of said core from said center in either direction of relative movement therefrom, the lower portion of said housing containing a magnet coaxial with and enclosing said tubular core, a cylindrical cup of conductive material affixed to the lower end of said tubular core such that it is within the field of said magnet and when it is moved, it serves to damp the movement of said tubular core, a helical spring coaxial with the lower portion of said tubular core and affixed adjacent the lower end thereof and held within the lower portion of said housing by retaining means, said spring compressing and expanding in accordance with the movement of the tubular core during operation, said tubular core being positioned in said housing and affixed thereto by a pair of substantially perpendicular, substantially rigid struts at each end of the core, said struts being wires at the points of flexure and being affixed to said housing and said tubular core.

2. An accelerometer as described in claim 1 including an electrical winding wound around said cylindrical cup and adapted such that external calibrating voltage may be applied to said electrical winding.

3. A suspension for the movable core of a differential transformer accelerometer comprising two pairs of substantially perpendicular, substantially rigid struts, one pair at each end of said movable core, one end of each of said struts of each pair being affixed to said movable core in line with its center of gravity, the other end of each of said struts being affixed to the housing of said differential transformer accelerometer, said struts being wires at the points of flexure.

4. Means for calibrating a differential transformer accelerometer comprising a coil wound around the damping cup of said accelerometer and means for applying electrical energy to said coil; said damping cup being cylindrical and formed of conductive material and affixed to one end of the movable core of said differential transformer and within the magnetic field of the magnet of said differential transformer accelerometer such that when electrical energy is applied to said coil, said movable core is caused to move.

5. An accelerometer comprising a tubular housing containing a lower and upper portion, the upper portion containing a pair of coaxially spaced secondary coils and a primary coil disposed in said space coaxially of said secondary coils in fixed end to end relation to each other, a source of alternating current adapted to be supplied to said primary coil, a tubular core of nonmagnetizable material extending through both the lower and upper portions of said housing, said tubular core having magnetizable material mounted thereon and disposed within said coils, the core being axially movable with respect to said coils during operation of the device, all of the coils being electrically symmetrical about the center of the primary coil and the length of said magnetizable material itself being greater than the length of said primary coil and so proportioned to the overall length of the combined coils that when the core is moved in one direction from said center, the core acts to increase the flux linkage between the primary and one of the secondaries and to decrease the flux linkage with the other secondary thereby to produce a net differential voltage across the two secondaries with a magnitude which is a linear function of the axial displacement of said core from said center in either direction of relative movement therefrom, the lower portion of said housing containing a magnet coaxial with and enclosing said tubular core, a cylindrical cup of conductive material affixed to the lower end of said tubular core such that it is within the field of said magnet and when it is moved, it serves to damp the movement of said tubular core, a helical spring coaxial with the lower portion of said tubular core and affixed adjacent the lower end thereof and held within the lower portion of said housing by retaining means, said spring compressing and expanding in accordance with the movement of the tubular core during operation, said tubular core being positioned in said housing and affixed thereto by a pair of substantially rigid struts making an angle of the order of 60° to 120° to each other at each end of the core, said struts being wires at the points of flexure and being affixed to said housing and said tubular core.

6. A mounting structure for a differential transformer accelerometer movable core comprising a pair of struts making an angle of the order of 60° to 120° to each other; each said strut being formed of hollow capillary rigid material through which is inserted a flexible wire, said wire protruding from each end of said capillary and being held in fixed relationship thereto.

7. A mounting structure as described in claim 6 wherein said struts are substantially perpendicular.

References Cited in the file of this patent

UNITED STATES PATENTS

| | | |
|---|---|---|
| 2,570,672 | Hathaway | Oct. 9, 1951 |
| 2,627,119 | Graham | Feb. 3, 1953 |
| 2,656,519 | Sheppard | Oct. 20, 1953 |
| 2,740,941 | Kelly | Apr. 3, 1956 |
| 2,788,664 | Coulbourn | Apr. 16, 1957 |
| 2,797,912 | Trostler | July 2, 1957 |